Inventor
Putnam M. Smith
By his Attorneys

March 11, 1947. P. M. SMITH 2,417,092
FOUL DETECTOR AND INDICATOR FOR BOWLING ALLEYS
Filed March 4, 1942 4 Sheets-Sheet 2

Inventor
Putnam M. Smith
By his Attorneys

March 11, 1947. P. M. SMITH 2,417,092
FOUL DETECTOR AND INDICATOR FOR BOWLING ALLEYS
Filed March 4, 1942 4 Sheets-Sheet 3

Inventor
Putnam M. Smith
By his Attorneys

March 11, 1947. P. M. SMITH 2,417,092
FOUL DETECTOR AND INDICATOR FOR BOWLING ALLEYS
Filed March 4, 1942 4 Sheets-Sheet 4

Inventor
Putnam M. Smith
By his Attorneys

Patented Mar. 11, 1947

2,417,092

UNITED STATES PATENT OFFICE 2,417,092

FOUL DETECTOR AND INDICATOR FOR BOWLING ALLEYS

Putnam M. Smith, Redwood Falls, Minn., assignor of one-half to A. Leslie Janes, Jr., Redwood Falls, Minn.

Application March 4, 1942, Serial No. 433,287

8 Claims. (Cl. 273—50)

My present invention relates to systems and apparatus for automatically detecting and indicating fouls made in the game of bowling and provides, among other things, very material improvements over the previous apparatus of this character and including the apparatus and system disclosed and broadly claimed in my previously filed co-pending application S. N. 421,435.

In the United States most league and tournament bowling is either sponsored or sanctioned by the American Bowling Congress (otherwise known as "A. B. C.") and is, therefore, conducted strictly in accordance with the rules laid down by the said American Bowling Congress, whose rules definitely define numerous acts which, when committed by bowlers, constitute fouls. In all American Bowling Congress sanctioned bowling alleys the foul line marker is distinctly provided at the junction of the alley and the approach or run-way thereto, and in "A. B. C." sanctioned league bowling prior hereto, foul judges have been employed for detecting and calling fouls, as they are committed, so that the players would be duly penalized. Usual'y, however, there is only one foul judge for a plurality of parallel alleys in use at the same time, so that the responsibility of the foul judge is very great and the likelihood of his making an error, particularly by way of an oversight of a foul committed by a bowler on one alley when two or more bowlers on different alleys foul at the same time, is ever present. Hence, there has been a great demand, extending over a period of years, for an automatic mechanism for detecting and indicating those fouls defined by the American Bowling Congress. In response to this long recognized demand much research has been conducted and numerous foul detecting devices have been developed (some to the point of extensive commercialization). The fact remains, however, that all previous attempts to solve this problem have been objected to as being incapable of detecting all of the kinds of fouls laid down by the American Bowling Congress and also as being incapable of dependably distinguishing between a bowled ball and part of a bowler's body. In this connection it may be said that the apparatus of my earlier filed application S. N. 421,435, while undoubtedly constituting a very great improvement over all of the prior art devices of this character, particularly with respect to its ability to reliably distinguish between a bowled ball and a bowler's foot slid over the foul line and its ability to detect certain types of fouls with absolute dependability, was incapable of detecting several other kinds of fouls defined by the American Bowling Congress and, therefore, could not be approved by the American Bowling Congress for use by teams or leagues sanctioned or sponsored thereby.

The apparatus of the present invention entirely overcomes the above objections and has demonstarted its capability of dependably detecting and indicating all of the several fouls defined in the rules of the American Bowling Congress as well as its ability to positively distinguish between an actual foul and an extremely slow ball. By way of elaboration on the importance of the last noted feature of the present invention, it may be said that most prior art foul detecting systems have attempted to distinguish between actual fouls and bowled balls by a calculated difference in the time interval required for bowled balls to pass through a detector zone and the time interval required for a bowler's foot or other part of his body to pass through or into and out of such detector zone. With such prior art systems exceptionally slow balls would often result in erroneous foul signals and actual fouls of exceptional'y short duration would often go undetected. As an important feature of the present invention, however, I have solved this problem of distinguishing between bowled balls and fouls without regard to the element of time, so that a bowling ball can actually stop any place on the foul line or bowling alley without causing the apparatus to call or signal a foul and when a foul is actually committed the apparatus will respond thereto and call the foul regardless of how short the time consumed in committing the foul.

Generally stated, any portion of a bowler's body that is projected over the foul line and on to the surface of the bowling alley, while the bowler is engaged in the act of bowling a ball that is subsequently discharged on to the alley, or, as a result of the act of discharging a bowling ball on to the alley, constitutes a foul, whereas, the projecting over the foul line and on to the alley of any part of a bowler's body prior to an act actually resulting in the discharge of a bowled ball on to the alley does not constitute a foul. With this general rule in mind, attention is directed to the fact that bowlers often project their feet or other portions of their bodies over the foul line on to the alley, while waiting for the pin setters, or otherwise, prior to engaging in the act which actually results in the discharging of a bowled ball and that, while these pre-play encroachments on the foul line do not constitute fouls, prior art detecting and indicating systems have had the annoying and objectionable characteristic of indicating fouls each time such pre-play encroachments on the foul line occurred.

Another important object and advantage of my present invention is, therefore, the provision of an automatic foul indicating system that will call fouls according to the established rules of the game, even to the extent of distinguishing between an actual foul and the same encroachment on the foul line committed prior to the act resulting in the discharge of a bowled ball.

The above and numerous other important objects and advantages of the present invention will be made apparent from the following specification and claims, together with the appended drawings.

In the accompanying drawings like characters indicate like parts throughout the several views.

Referring to the drawings.

Figure 8:
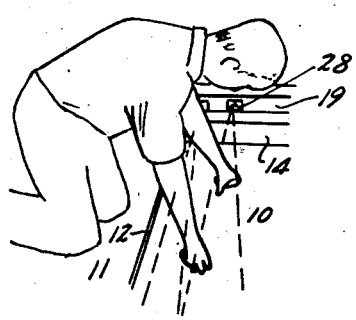
Figure 9:
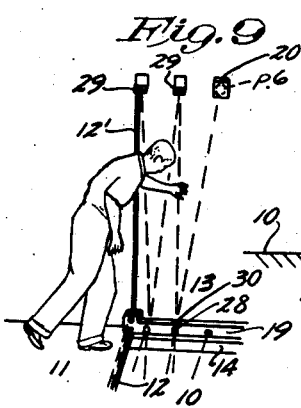
Figure 4:
Fig. 4 is a somewhat enlarged fragmentary sectional view taken on the line 4—4 of Fig. 1.
Figure 2:
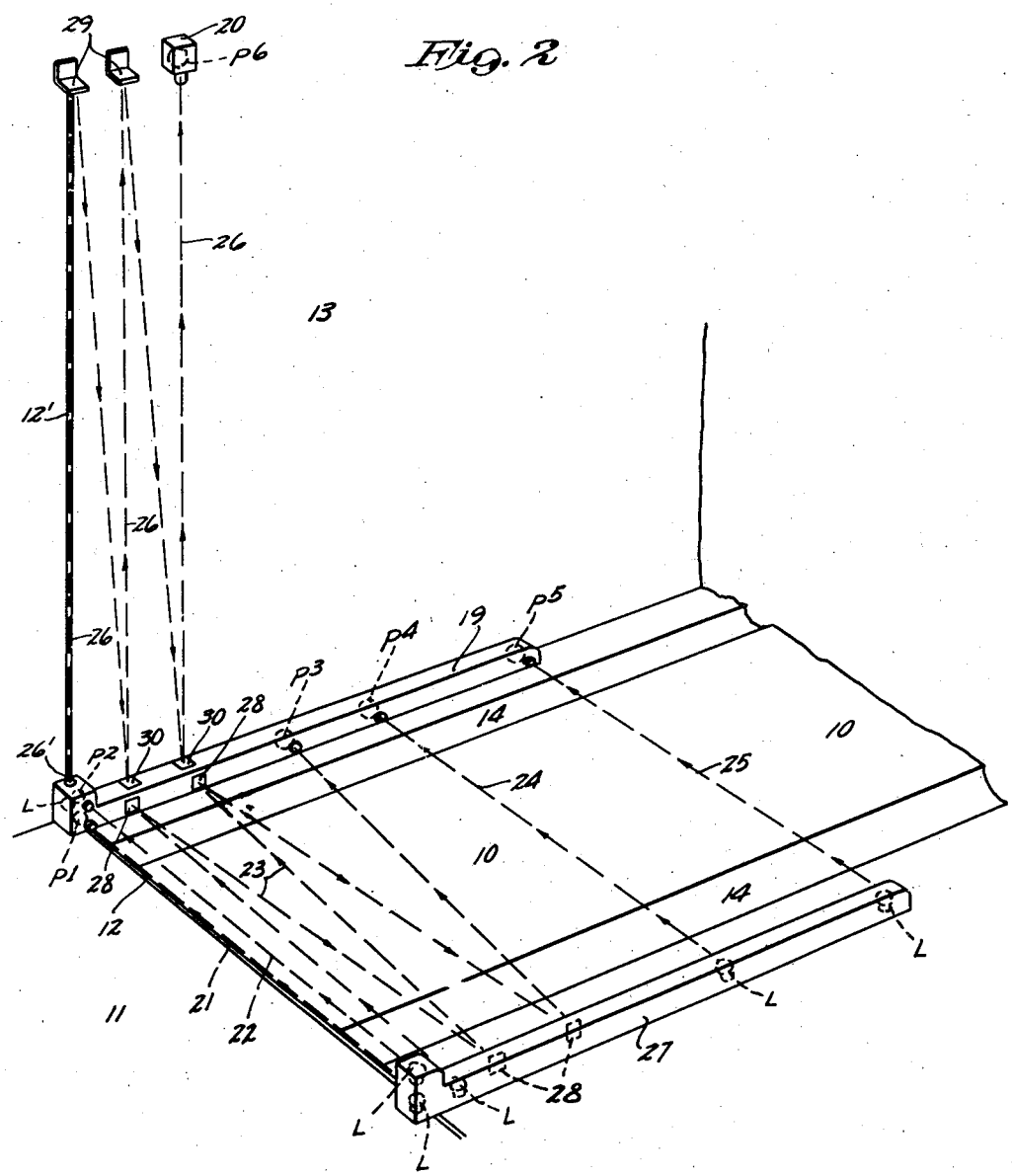
Fig. 2 is a fragmentary perspective view showing the front end portion and runway leading to the bowling alley of Fig. 1.
Figure 3:
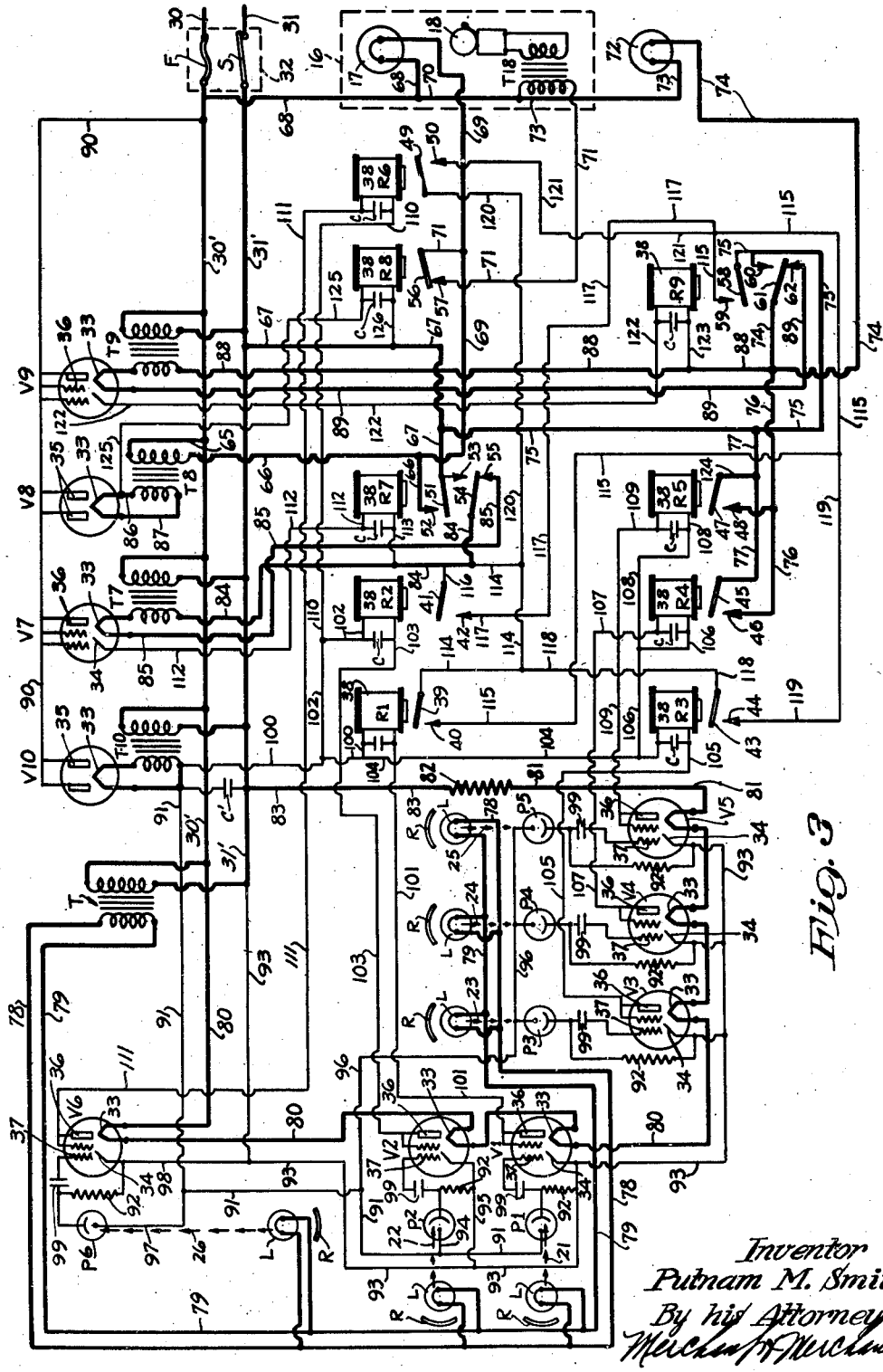
Fig. 3 is a diagrammatic view illustrating a preferred electrical hook-up and the various component parts making up the preferred embodiment of the invention herein illustrated.
Figure 10:
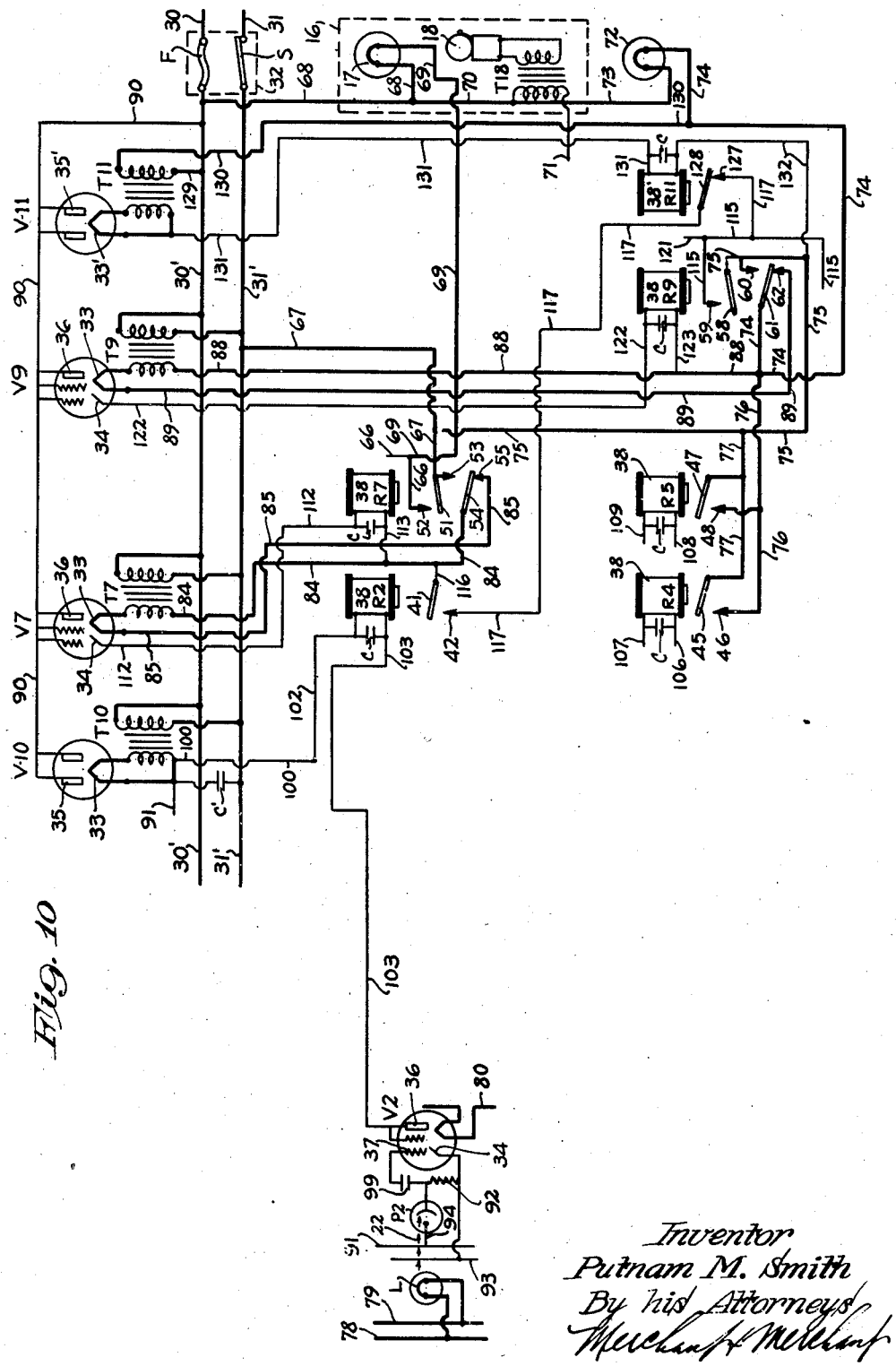

Figs. 5, 6, 7, 8 and 9 are fragmentary perspective views on reduced scales showing several different kinds of fouls which will be detected by the present system; and Fig. 10 is a diagrammatic view illustrating the electrical hook-up of a modified form of the invention embodying, in addition to all that is shown in Fig. 3, a further important feature. In this last view only those elements of Fig. 3 necessary to an explanation of the additional feature have been illustrated and all other parts and wires common to Fig. 3 have been broken away.

With reference particularly to Figs. 1, 2, and 4 to 9 inclusive, a conventional bowling alley is indicated by 10, the approach or runway to the alley by 11, and the foul line marker between the runway or approach 11 and the alley 10 is indicated by 12. In several of these same figures a wall adjacent one side of the alley 10 and runway 11 is indicated by 13 and the gutters at opposite sides of the alley 10 are indicated by 14. A vertical foul line marker 12' on the wall 13 is shown in Figs. 2, 5, 6 and 9 and in Fig. 1 the customary bowling pins are indicated at 15.

The foul signal apparatus proper of the present invention, like that of the invention of my prior application, above identified, includes both visual and audible signalling devices contained within a common signal housing or casing 16 that is preferably situated near the rear of the alley and suitably suspended above the same. The visual signal device is shown as being in the nature of an incandescent lamp 17 and the audible signalling device illustrated is shown as being in the nature of a bell 18 of the conventional electromagnetic type.

In the preferred embodiment of the invention, herein illustrated, a plurality of detectors P1, P2, P3, P4, P5 and P6 are employed, these preferably and as illustrated being in the nature of photoelectric cells. The photo-electric foul detecting devices P1 to P5 inclusive are located within a common casing 19 positioned at one side of the alley and having a plurality of light admitting apertures, one located in front of each of the photo-electric cells P1 to P5 inclusive. The photo-electric foul detecting device P6 is enclosed in a separate casing 20 located on the wall 13 several feet above the plane of the alley and inwardly of the wall foul line marker strip 12' and which, casing, may be assumed to have a downwardly opening light receiving aperture, not shown.

The photo-electric cell detector P1 is normally activated by a single leg light wave beam 21. The photo-electric cell detector P2 is normally activated by a single leg light wave beam 22. The photo-electric cell detector P3 is normally activated by a multiple leg zigzag light wave beam 23. The photo-electric cell detector P4 is normally activated by a single leg light wave beam 24. The photo-electric cell detector P5 is normally activated by a light wave beam 25, and the photo-electric cell detector P6 is normally activated by a multiple leg zigzag light wave beam 26.

The light wave beams 21 to 25 inclusive are emitted from the common light projector casing 27 through light emitting apertures 21' to 25' inclusive respectively, back of each of which, light emitting apertures, is a suitable incandescent lamp L and a reflector R.

The light wave beam 26 originates in one end portion of the housing 19 and is emitted from said housing through a light emitting aperture 26'. The zigzag or multiple leg light wave beam 23 is reflected several times across the alley 10 by reflectors 28 located on the sides of the casings 19 and 27. The multiple leg wall beam 26 is reflected back and forth several times between the plane of its light source L and the plane of the detector P6 by a series of reflectors 29 and 30, the former being mounted on the wall 13 and the latter being mounted on the top of casing 19. The light beams 21 to 25 inclusive are all directed parallel to the surface of the alley 10 and far below the plane of the maximum diameter of a ball B positioned on the alley. The light beam 22, however, is, while also directed parallel to the surface of the alley, located directly over the beam 21 and much closer to the plane of the maximum diameter of the ball B. The wall beam 26 is directed in closely spaced parallel relation to the wall 13. Obviously each of the beams 21, 22, 24 and 25 and each leg of zigzag beam 23 constitutes a narrow detector zone through which a ball B rolled over the foul line and down the alley will pass.

The entire apparatus hereof is powered from a conventional alternating current power and light line consisting of leads 30 and 31 which, for the purpose of this case, may be assumed to carry 110 volts. The power line leads 30 and 31 enter a combined switch and fuse box 32 and are connected, the former to a fuse F and the latter to a master control switch S.

Further apparatus diagrammatically indicated in Fig. 3 includes thermo-electronic vacuum tubes V1 to V10 inclusive, transformers of the step-down variety T7, T8, T9, T10 and T18, and electro-magnetic relays R1 to R9 inclusive. The vacuum tubes V1 to V10 each include an electrically heated filament 33. Tubes V8 and V10 are of the fast heating variety, wherein the filaments serve as the electron-emitting cathodes, and the tubes V1 to V7 inclusive and V9 are of the slower heating variety embodying separate electron-emitting cathodes 34. Vacuum tubes V8 and V10 are of the type 80 rectifier series and each have two plates or anodes 35 which, for the present purpose, are connected together for half wave rectification. The other vacuum tubes are all of the multiple grid type and of these tubes V7 and V9 each have their two grids and plate connected together to serve as a common anode 36, whereas tubes V1 to V6 inclusive each have only one grid connected to the plate thereof to serve as common anode 36. The other grids of the tubes V1 to V6 inclusive are reserved for the use as control grids and are indicated by 37.

The relays R1 to R9 inclusive each include an electro-magnetic coil 38 and switches under control thereof and which, switches, will immediately be described. The switch of relay R1 comprises contacts 39 and 40. The switch of relay R2 comprises contacts 41 and 42. The switch of relay R3 comprises contacts 43 and 44. The switch of relay R4 comprises contacts 45 and 46. The switch of relay R5 comprises contacts 47 and 48. The switch of relay R6 comprises contacts 49 and 50. The relay R7 includes two switches one comprising contacts 51 and 52, and the other comprising contacts 53, 54 and 55. The switch of relay R8 comprises contacts 56 and 57. The relay R9 includes two switches, one of which comprises contacts 58 and 59, and another of which comprises contacts 60, 61 and 62.

The primary windings of transformers T7, T9 and T10 and the primary of a transformer T are connected in parallel across the power line leads 30 and 31 through the medium of leads 30' and 31' which latter leads form extensions of the power line leads 30 and 31 respectively. Hence, these transformers T, T10, T7 and T9 will always be energized when the master control switch S is closed. The primary winding of transformer T8 is connected across the leads 30' and 31' in a normally open circuit comprising leads 65 and 66, contacts 51 and 52 of relay R7, and a lead 67.

The foul signal lamp 17 is connected across the leads 30' and 31' in a normally open circuit comprising a lead 68, a lead 69, part of lead 66, contacts 51 and 52 of relay R7, and lead 67. The signal bell 18 is permanently connected across the secondary of the bell transformer T18 and the primary winding of said transformer T18 is connected across the signal lamp leads 68 and 69, so as to be in parallel with the signal lamp, by a normally closed shunt circuit comprising leads 70 and 71, the latter of which, leads, has interposed therein the normally closed contacts 56 and 57 of relay R8.

For the purpose of indicating to the players, and also preferably to the pin setter, the condition of the signal detecting apparatus, I preferably provide a tell-tale lamp 72 that is adapted to be energized by closing of any one of the following described parallel circuits, to wit, (a) part of the lead 68, the lead 70, a lead 73, said tell-tale lamp 72, a lead 74, contacts 60 and 61 of relay R9, a lead 75 and part of lead 67; (b) a circuit parallel to the one just described and comprising leads 68, 70, 73, 74, 75, contacts 46 and 45 of relay R4, a lead 77 and leads 75 and 67; and (c) a normally open circuit just as described in connection with (b) above but including contacts 48 and 47 of relay R5 in place of the switch contacts of relay R4.

The filaments of the several light wave projector lamps L are operated from the secondary of transformer T by a normally closed circuit comprising leads 78 and 79 across which the filaments of the said several lamps L are connected in parallel.

The filaments 33 of vacuum tubes V1 to V6 inclusive are operated directly from the power line extension leads 30' and 31' in a common series circuit comprising leads 80, 81, a voltage dropping resistor 82 and a lead 83. The filament 33 of vacuum tube V7 is operated from the secondary of transformer T7, through a normally closed circuit comprising a lead 84, contacts 55 and 54 of relay R7, and a lead 85. The filament 33 of vacuum tube V8 is energized from the secondary of transformer T8 through a permanently closed circuit comprising leads 86 and 87. The filament 33 of vacuum tube V9 is energized from the secondary of transformer T9 through a normally closed circuit comprising a lead 88, part of lead 74, contacts 61 and 62 of relay R9, and a lead 89.

The photo-electric cell detectors P1 and P6 inclusive are connected in parallel pulsating direct current circuits as follows. The said circuit of cell P1 comprises a lead 90, the rectifier tube V10, a lead 91, the cell P1, a load resistor 92 and a lead 93 returning to the A. C. line through lead 31'. The circuit of cell P2 comprises lead 90, rectifier tube V10, lead 91, a short lead 94, a load resistor 92, a lead 95 and lead 93. The input or positive sides of the circuits of photo cell detectors P3, P4 and P5 are all commoned with the input or positive sides of cells P1 and P2 by a common lead 96. The output side of each of the cells P3, P4 and P5 is connected through its own load resistors 92 and the common lead 93 that connects to the power line extension lead 31', thereby completing the circuits of the cells P3, P4 and P5. The circuit of the photo cell detector P6 comprises lead 90, rectifier tube V10, part of lead 91, a lead 97, a load resistor 92, a lead 98 and part of lead 93 going back to the power line through lead 31'.

With the arrangement described, rectified direct current will flow freely in the circuits of the photo-cell detectors P1 to P6 inclusive so long as these cells are activated by their respective cooperating light beams 21 to 26 inclusive respectively, but current flowing in the circuit of any one of the photo cells P1 to P6 inclusive will be greatly reduced upon interruption of its respective cooperating light beam. Hence, when the light beam to any one of the photo cells is interrupted, the resultant variation in current flow in the circuit of that cell will produce a variation in the voltage drop across the load resistor 92 of that circuit.

For the purpose of transmitting the voltage variation occurring across the load resistors 92 to the control grids 37 of its cooperating vacuum tube V1, V2, V3, V4, V5 or V6, suitable coupling condensers 99 are provided.

The cathodes 34 of the vacuum tubes V1 to V6 inclusive are all connected to the power line extension leads 31' through leads already described.

The discharge circuit of vacuum tube V1 comprises, in addition to leads 90 and vacuum tube V10, a lead 100, the solenoid coil 38 of relay R1, a lead 101, the plate 36 and cathode 34 of vacuum tube V1, and lead 93 which runs to leads 31'. The discharge circuit of vacuum tube V2 comprises, in addition to leads 90 and vacuum tube V10, part of lead 100, a lead 102, the coil 38 of relay R2, a lead 103, plate 36 and cathode 34 of tube V2, and leads previously described and running to lead 31'. The plate circuit of vacuum tube V3 comprises, in addition to lead 90 and rectifier tube V10, part of lead 100, a lead 104, the coil 38 of relay R3, a lead 105, the plate 36 and cathode 34 of vacuum tube V3, and leads previously described and running to power line extension lead 31'. The discharge circuit of the vacuum tube V4 also includes the rectifier tube V10 and further comprises part of lead 100, part of lead 104, a lead 106, coil 38 of relay R4, a lead 107, the plate and cathode of tube V4 and leads previously described running to leads 31'. The discharge circuit of vacuum tube V5 also includes the rectifier tube V10 and further comprises parts of leads 100, 104, 106 and a lead 108, the coil 38 of relay R5, a lead 109, the plate and cathode of tube V5 and leads returning to lead 31'. The discharge circuit of vacuum tube V6 also includes the rectifier tube V10 and further comprises part of lead 100, part of lead 102, a lead 110, the coil 38 of relay R6, a lead 111, the plate and cathode of vacuum tube V6 and leads previously described and which run to power line lead 31'.

With the arrangement above described, the control grids 37 will be swung in a positive direction by current flowing in the circuits of photo-cell detectors P1 to P6 inclusive, respectively so long as said cells are activated by their respective cooperating light beams 21 to 26 inclusive, and of course when the control grids 37 of said tubes V1 to V6 inclusive are swung in a positive direction, maximum current will flow in the plate circuits of said tubes and will operatively energize the coils 38 of relays R1 to R6 inclusive. However, when the light beams to any one of the photo-cell detectors P1 to P6 inclusive is interrupted, current flow in the circuit of that photo-cell detector will drop materially, which will result in the grid 37 of the coupled tube V1, V2, V3, V4, V5 or V6 being swung negative. When the grid 37 of any one of the tubes V1 to V6, inclusive, is thus swung negative, the current flow in the plate circuit of that tube will be greatly reduced, with the result that the movable switch contact or contacts of the relay R1, R2, R3, R4, R5 or R6 whose coil is connected in that plate circuit will be dropped to its lower position.

Coil 38 of relay R7 is adapted to be energized by current supplied from rectifier tube V7 upon completion of any one of four circuits each of which includes the contacts 58 and 59 of relay R9 and which four circuits are as follows, to wit, (1) the first of these circuits comprises lead 90, anode and cathode of V7, a lead 112, the coil 38 of relay R7, a lead 113, part of lead 84, a lead 114, contacts 39 and 40 of relay R1, a lead 115, contacts 59 and 58 of relay R9, lead 75, and part of lead 67; (2) the second of the circuits for the coil 38 of relay R7 is common to the circuit described under (1) above down to the coil 38 of relay R7 and further comprises lead 113, part of lead 84, a short lead 116, contacts 41 and 42 of relay R2, a lead 117, part of lead 115, contacts 59 and 58 of relay R9, lead 75, and part of lead 67; (3) the third of the circuits for the coil 38 of relay R7 is also common to the circuit described under (1) above down to the coil 38 of relay R7 and further comprises the lead 113, part of lead 84, part of lead 114, a lead 118, contacts 43 and 44 of relay R3, a lead 119, part of lead 115, contacts 59 and 58 of relay R9, lead 75 and part of lead 67; (4) the fourth of the said circuits for the coil 38 of relay R7 is also common to the circuit described under (1) above down to the said coil 38 of relay R7 and further comprises lead 113, part of lead 84, part of lead 114, a lead 120, contacts 49 and 50 of relay R6, a lead 121, part of lead 115, contacts 59 and 58 of relay R9, lead 75, and part of lead 67 extending to lead 31'.

The coil 38 of relay R9 is adapted to be supplied with rectified current from vacuum tube V9 through any one of three parallel circuits which are as follows, to wit, (1) lead 90, plate and cathode elements of V9, a lead 122, the coil 38 of relay R9, a lead 123, part of lead 88, lead 76, contacts 46 and 45 of relay R4, lead 77, part of lead 75, and part of lead 67 extending to lead 31'; (2) the second of the said circuits for the coil 38 of relay R9 is common to the circuit described under (1) above down to the coil 38 of relay R9 and further comprises the lead 123, part of lead 88, part of lead 76, contacts 48 and 47 of relay R5, a lead 124, part of lead 77, part of lead 75, and part of lead 67 running to lead 31'; (3) the third of the said circuits for the coil 38 of relay R9 is also common to the circuit described under (1) above down to the coil 38 of relay R9 and further comprises lead 123, part of lead 88, part of lead 74, contacts 61 and 60 of relay R9, lead 75, and part of lead 67 running to lead 31'. As will hereinafter be apparent, the contacts of relays R4 and R5 are only momentarily closed and serve merely to initiate closing of a circuit through the coil 38 of relay R9 which results in closing of contacts 61 and 60 of relay R9 which thereafter serves to hold or maintain a circuit through the coil 38 of relay R9 independently of either of the switches of relays R4 or R5.

The coil 38 of relay R8 is adapted to be energized by rectified direct current supplied from rectifier tube V8 and is, therefore, serially connected in the discharge circuit of tube V8 which comprises lead 90, plate 35 and element 33 of tube V8, a lead 125, the coil 38 of relay R8, a lead 126 and part of lead 67 extending to power line lead 31'.

*Operation, Figs. 1 to 9 inclusive*

To render the system operative, it is merely necessary to manually close the switch S which will remain closed during the entire period that the equipped alley is in use. Responsive to closing of the switch S the following things occur, to wit, (a) the circuits of the heaters or filaments of the vacuum tubes V1 to V7 inclusive and V9 and 10 are immediately energized so that said tubes will become operative as soon as they have heated up, while leaving vacuum tube V8 in an inoperative condition with its filament in a de-energized condition; (b) the light beam projector lamps L will all be rendered operative and will complete the light wave beams 21 to 26 inclusive, thereby activating the photo-electric cell detectors P1 to P6 inclusive; (c) the activation of the cells P1 to P6 inclusive will result in current flow through the circuits of said cells which, in turn, results in a swinging of the grids 37 of the tubes V1 to V6, inclusive, in a positive direction; (d) with the control grids 37 of tubes V1 to V6 inclusive thus swung in a positive direction, maximum current will flow in the discharge circuits of said tubes V1 to V6 inclusive, thereby energizing the coils 38 of relays R1 to R6 inclusive and causing the movable switch contacts of relays R1 to R6 inclusive to be moved to their upper positions shown in Fig. 3. When the above functions are completed, all of the switches will be in the positions shown in Fig. 3 in which condition of the apparatus the foul signals 17 and 18 and the tell-tale lamp 72 are inoperative, as is also vacuum tube V8. The apparatus will now remain in the condition shown in Fig. 3 until one or more of the light beams 21 to 25 inclusive is interrupted.

Now if we assume that a ball is bowled and that this bowled ball is rolled over the foul line 12, it will be seen that the ball will successively pass through the beams 22, 21, 23, 24 and 25 in the order just named. Of course, the ball thus rolled will pass out of all of the detector zone-creating beams 21, 22 and 23 before entering and interrupting either of the beams 24 or 25. Now this successive interruption of the light beams 21 to 25 inclusive results in the following functions, to wit, (a) the momentary de-activation of cells P2, P1, P3, P4 and P5 in the order just named; (b) the successive momentary swinging of the control grids 34 to vacuum tubes V2, V1, V3, V4 and V5 in a negative direction in the order just named; (c) the consequent falling off of the flow of current in the discharge circuits of vacuum tubes V2, V1, V3, V4 and V5 in the order just named; (d) the momentary de-energization of the coils 38 of relays R2, R1, R3, R4 and R5; and (e) the momentary closing of contacts 39 and 40 of relay R1, contacts 41 and 42 of relay R2, contacts 43 and 44 of relay R3, contacts 45 and 46 of relay R4, and contacts 47 and 48 of relay R5. Since the normally open contacts of relays R1 to R3, inclusive, are all interposed in circuits that include the coils 38 of relay R7 and the now open contacts 58 and 59 of relay R9, it will be apparent that there will be no function resulting from the above described momentary closing of the said normally open contacts of relays R1 to R3 inclusive. However, the momentary closing of the contacts 45 and 46 of relay R4, as a result of interception of beam 24, results in the following important functions, to wit, (a) the momentary completion of an initiating circuit through the coil 38 of relay R9 and which comprises lead 90, vacuum tube V9, lead 122, lead 123, part of lead 88, lead 76, contacts 46 and 45 of relay R4, lead 77, part of lead 75, and part of lead 67; (b) as a result of the said momentary closing of the circuit through coil 38 of relay R9, contacts 61 and 60 of relay R9 will be closed to provide a holding circuit for the coil 38 of relay R9 comprising lead 90, vacuum tube V9, lead 122, lead 123, part of lead 88, part of lead 74, contacts 61 and 60 of relay R9, lead 75 and part of lead 67; (c) the opening of contacts 61 and 62 of relay R9 and consequent de-energization of the circuit for the filament 33 of vacuum tube V9 which circuit comprises lead 88, part of lead 74, contacts 61 and 62 of relay R9, and a lead 89; and (d) the completion of the circuits for the tell-tale lamp 72 as a further direct result of closing of contacts 61 and 60 of relay R9 and which comprises lead 68, lead 73, lead 74, contacts 61 and 60, lead 75, and lead 67; and (e) the closing of contacts 58 and 59 of relay R9.

In view of the holding circuit for coil 38 of relay R9 established through contacts 61 and 60 of relay R9 and the breaking of the filament circuit of tube V9 by opening of contacts 62 and 61 of relay R9, the movable contacts 58 and 61 of relay R9 will remain in their upper positions independently of the contacts of relays R4 and R5 but only for the relatively brief period that is required for the tubes V9 to cool to the point where the coil 38 of relay R9 becomes de-energized, at which time the contacts 61 and 58 of relay R9 will return to their normal lower positions. Of course, the cooling time required for the tube V9 to effectively de-energize the coil R9 responsive to opening of its filament circuit will depend upon the type of tube used but preferably a tube will be selected that will give an operating interval of from six to twelve seconds for the relay coil of R9. The tell-tale lamp 72 will remain operative during this six to twelve second interval, only, during which time it will indicate that a ball has been bowled and that the system is in condition to call a foul responsive to any encroachment upon the foul line during the period it is illuminated. Hence, if the bowler should drop any article on to the alley while discharging the ball, the tell-tale lamp will warn him against attempting to pick it up during the period said tell-tale lamp is operating.

Since the contacts 58 and 59 of relay R9 are interposed in a plurality of circuits each of which includes the coil 38 of relay R7 and the pair of contacts of a different relay R1, R2, R3 or R6, there will be no function resulting from the closing of contacts 58 and 59 at this time, due to the now open condition of the contacts of all of said relays R1, R2, R3 and R6. This momentary closing of contacts 47 and 48 of relay R5 will tend to produce exactly the same functions as are above described in connection with the momentary closing of contacts 45 and 46 of relay R4, but when the contacts 47 and 48 of relay R5 are momentarily closed subsequent to establishing of the holding circuit through relay R9, as above described, the said closing thereof will only tend to accomplish what has already been accomplished by the closing of the contacts of relay R4. However, if the ball should have been lofted over and missed the beam 24, the interception of beam 25 by the ball B would have resulted in momentarily closing of contacts 47 and 48 of relay R5 while coil 38 of relay R9 was de-energized, and the result of such closing would have been just as described in connection with the closing of the contacts of relay R4 in the foregoing description of the operation.

If no foul is committed during the six to twelve second period that the coil 38 of relay R9 is energized, the system will automatically resume its normal condition shown in Fig. 3 at the termination of this period. However, if a foul be committed during the period that the coil of relay R9 is energized, the foul signals 17 and 18 will, as will hereinafter be made apparent, be instantly set in operation.

Now let us assume that the bowler is in the act of committing what is commonly known as a toe foul (shown in Fig. 5) during the six to twelve second interval that the coil 38 of relay R9 is energized. This so-called toe foul, as exemplified in Fig. 5, consists in sliding the toe or forefoot over the foul line 12 and will usually result in interrupting only the beam 21 to photocell P1. Of course, when the beam 21 is interrupted, the photo-cell detector P1 will be momentarily de-activated with the result that the current flowing in the discharge circuit of V1 through coil 38 of relay R1 will momentarily drop and cause a momentary closing of contacts 39 and 40 of relay R1. Now this closing or recurrent closing of contacts 39 and 40 of relay R1, during the interval that the coil 38 of relay R9 is energized and the movable switch contacts 58 and 61 are in their upper positions, will result in the following functions, to wit, (a) the initiating of a circuit through the coil 38 of relay R7 comprising lead 90, vacuum tube V7, lead 112, lead 113, part of lead 84, lead 114, contacts 39 and 40 of relay R1, lead 115, now closed contacts 59 and 58 of relay R9, lead 75 and part of lead 67; (b) the establishment of a holding circuit for coil 38 of relay R7 comprising lead 90, vacuum tube V7, lead 112, lead 113, part of lead 84, contacts 54 and 53 of relay R7 and lead 67; (c) the establishing of a circuit through the coil 38 of relay R8 comprising lead 90, rectifier tube V8, lead 125, lead 126 and part of lead 67 extending to lead 31', this circuit being completely de-energized initially due to the cold inoperative condition of tube V8; (d) the completion of the primary circuit of transformer T8 comprising lead 65, lead 66, contacts 52 and 51 of relay R7 and lead 67; (e) the initiating of operation of foul signal 17 by completing the circuit therethrough comprising lead 68, lead 69, part of lead 66, contacts 52 and 51 of relay R7 and lead 67; (f) the establishing of the primary circuit of transformer T18 for signal 18 and which comprises part of lead 68, lead 71, contacts 57 and 56 of relay R8, part of lead 69, part of lead 66, contacts 52 and 51 of relay R7 and lead 67; and (g) the opening of the filament circuit of tube V7 by opening of contacts 54 and 55 of relay R7.

The foul indicating signals 17 and 18 will now be rendered simultaneously operative immediately upon energization of the coil 38 of relay R7, but the audible signal 18 will be automatically turned off after a very brief period of operation (preferably three to five seconds) by virtue of heating of rectifier tube V8 and consequent energization of coil 38 of relay R8 and resultant opening of contacts 56 and 57 of relay R8. The operation of the visible signal 17 will be automatically terminated at the termination of a somewhat longer period (preferably six to twelve seconds) by virtue of de-energization of the filament circuit of tube V7 resulting from opening of contacts 54 and 55 of relay R7 and the cooling of said tube V7.

From the above it will be seen that the length of the operating period of the audible foul signal 18 is determined by the time required for tube V8 to heat up to an operative condition and that the length of the operating period of visible signal 17 is determined by the time required for tube V7 to cool. These times may, of course, be varied by choice of tubes. The time of termination of the operating period of the tell-tale lamp 72, on the other hand, is determined by the time required to cool vacuum tube V9. Obviously as soon as the tubes V7 and V9 have cooled to the point where coils 38 of relays R7 and R9 become de-energized, the entire apparatus will resume the normal condition shown in Fig. 3 and tube V7 will immediately be re-heated preparatory to foul detection.

Figure 1:
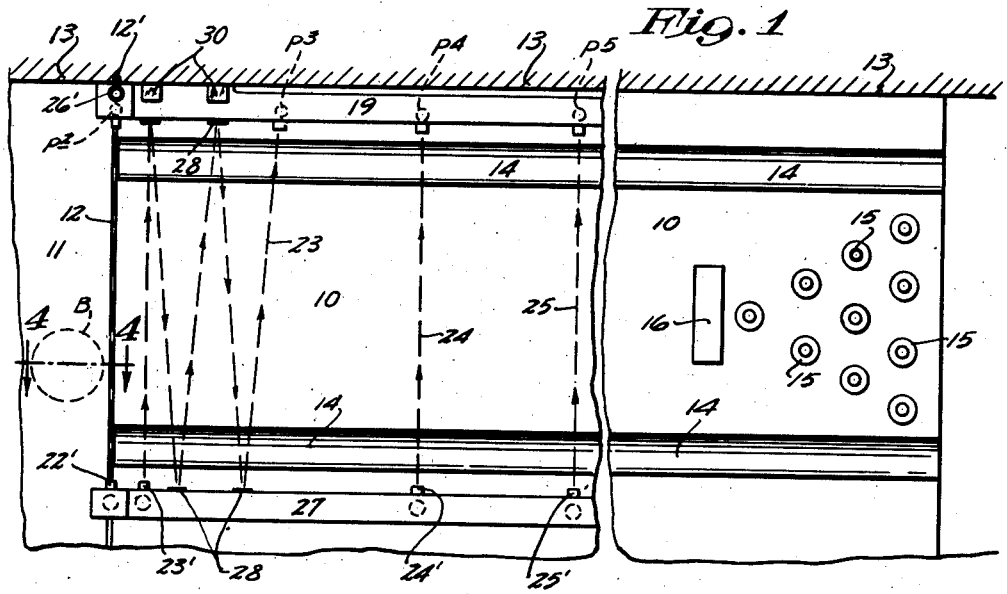
Fig. 1 is a plan view with some parts broken away of a conventional bowling alley equipped with the foul detecting and indicating system of the present invention.
Figure 5:
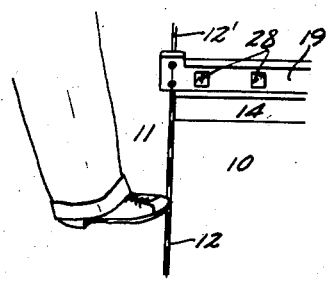
Figure 6:
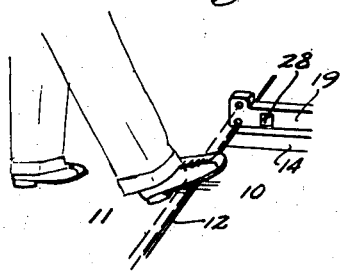

One of the very important objects of the present invention, and one which was not specifically pointed out heretofore, is the detection and indication of the so-called heel and toe type of foul, illustrated in Fig. 6, wherein it will be noted that the bowler's heel is resting on the approach to the alley with his forefoot projecting over the foul line 12 at a forward inclination out of the path of light beam 21 but in a position to intercept light beam 22. Of course, the interruption of light beam 22 and the consequent de-activation of photo-cell detector P2 will result in de-energization of coil 38 of relay R2 and the closing of contacts 41 and 42 of relay R2. This closing of contacts 41 and 42 of relay R2 closes an initiating circuit through the coil 38 of relay R7 comprising lead 90, vacuum tube V7, lead 112, lead 113, part of lead 84, lead 114, contacts 41 and 42 of relay R2, lead 117, lead 115, now closed contacts 59 and 58 of relay R9, lead 75, and lead 67 to lead 31'. After this initial energization of coil 38 of relay R7, the movable contacts 54 and 51 of relay R7 will be moved to their upper positions and the system will function exactly the same as it did responsive to initial energization of the coil 38 of relay R7 by the closing of contacts of relay R1.

Figure 7:
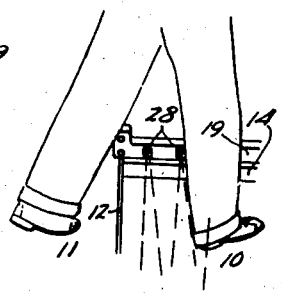

If any leg of the zigzag light beam 23 be broken or remains broken, during the time that the coil 38 of relay R9 has been energized as a result of a bowled ball having previously intersected either of the beams 24 or 25, the resultant momentarily de-energization of coil 38 of relay R3 and closing of contacts 43 and 40 of relay R3 will initiate energization of the coil 38 of relay R7 by closing of the circuit comprising lead 90, vacuum tube V7, lead 112, lead 113, part of lead 84, part of lead 114, lead 118, contacts 43 and 44 of relay R3, lead 119, part of lead 115, now closed contacts 59 and 58 of relay R9, lead 75, and part of lead 67. This energization of coil 38 of relay R7 will result in moving of the contacts 51 and 54 of relay R7 to their upper positions and from this point on the system will function just as described in connection with the initial energization of coil 38 of relay R7 by closing of the contacts of either of relays R1 or R2. Two types of fouls which may not interrupt either of the light beams 21 or 22 but which inevitably interrupt one or more of the legs of the zigzag light beam 23 are shown in Figs. 7 and 8. In connection with Fig. 7 it may be assumed that the bowler has stepped over both of the beams 21 and 22 without interrupting the same and placed his foot on the alley in a position to intercept one or more of the legs of zigzag beam 23. In Fig. 8 it is assumed that the bowler stumbled in the course of discharging the bowled ball and landed with his hands on the alley in a position to interrupt one or more legs of the zig zag beam 23 and without having interrupted either of the beams 21 or 22. Of course, in connection with either Figs. 7 or 8, it may be assumed that the bowler has successively interrupted the beams 21, 22 and 23, but from what has been previously said, it should be clear that the end point result would be identical.

Another type of foul which is quite commonly made on alleys bordering a wall or a convenient pillar is the so-called wall foul exemplified in Fig. 9, wherein it is assumed that the bowler has placed his hand on the wall inwardly of the foul line markers 12 and 12' to prevent falling on the alley. When the bowler commits this act, his hand or arm will intercept one or more legs of the beams 26 which will result in deactivation of the photo-cell detector P6 and consequent deenergization of the coil 38 of relay R6. This de-energization of coil 38 of relay R6 results in closing of contacts 49 and 50 of relay R6 and the initial energization of coil 38 of relay R7 by completion of the circuit comprising lead 90, vacuum tube V7, lead 112, lead 113, part of lead 84, part of lead 114, lead 120, contacts 49 and 50 of relay R6, lead 121, part of lead 115, contacts 59 and 58 of relay R9, lead 75, and part of lead 67 to lead 31'. As a result of this initial energization of coil 38 of relay R7, contacts 54 and 51 of relay R7 are moved to their upper positions from which time on the mechanism will operate just as described heretofore in connection with the closing of the circuits through coil 38 of relay R7 by closing of the contacts of relays R1, R2, or R3.

From the foregoing it should be obvious that the interruption of any one or plurality of light beams 21, 22, 23 or 26 prior to interruption of one or both of the light beams 24 or 25 cannot possibly result in a signal of any kind, since the coil 38 of relay R9 will be in a de-energized condition with the movable contacts 58 and 61 thereof in their lower normal positions wherein, among other things, the circuits through coil 38 of relay R7 is opened by virtue of the open condition of contacts 58 and 59 of relay R9.

While it has been assumed in the foregoing description of the operation that a bowled ball would roll through all of the beams 21 to 25 inclusive, attention is directed to the fact that many bowlers bowl what is known as a lofted ball which lands on the alley at some distance from the foul line 12, and it is for this reason that I space the light beam 24 at some distance (approximately four feet) from the foul line 12 where it will be intercepted by most bowled balls but where it is not so far spaced from the foul line as to produce a serious time lag between the discharge of even a slow ball from the bowler's hand and the intersection of the light beam 24. In fact, exhaustive experiment has conclusively proven that the time interval consumed for the ball to pass from a bowler's hand to the light beam 24 is so very short as to make the commission and completion of a foul in that period a virtual impossibility.

The purpose of the detector zone-forming light beam 25, which is spaced considerably further from the foul line 12 than is the beam 24, is to catch a fast and high lofted ball which might possibly have passed above the light beam 24. Although the spacing of the beam 25 from the foul line 12 may be considerably greater than the spacing of beam 24 of the foul line 12, the time interval consumed for an exceedingly fast ball to pass the bowler's hands to the beam 25 will usually be less than the time required for a slower bowled ball to pass from the bowler's hand to the light beam 24.

With respect to Fig. 3, all of the elements therein lying to the left of the signals 17, 18 and 72, constitute foul detecting signal control apparatus and, in a sense, this detecting and signal control apparatus is a double or duplex system involving cooperating primary and secondary control apparatus. In this connection it may be said that the primary control apparatus for the signal 17, comprises photo-cell detectors P4 and P5 and their respective cooperating light wave projector lamps L, vacuum tubes V4, V5 and V9, transformers T4, T5 and T9, and relays R4, R5 and R9, whereas, the secondary control apparatus for the signal 17 comprises photo-cell detectors P1, P2, P3 and P6 and their respective cooperating lamps L, vacuum tubes V1, V2, V3 and V6, transformers T1, T2, T3 and T6, and relays R1, R2, R3 and R6. Vacuum tube V10 and transformer T10 may be considered as common to both the primary and secondary control apparatus and relay R7, tube V7 and transformer T7 are common to and under joint control of the primary and secondary apparatus. With the system thusly divided into primary and secondary signal control apparatus, it may be said that the primary apparatus is responsive to conditions of de-activation or detection of either of its detectors P4 or P5 to initiate operation of the foul signal 17 dependent upon a signal operative condition of the secondary control apparatus and is responsive to conditions of activation or non-detection of its detectors P4 and P5 to render the secondary apparatus incapable of initiating operation of the foul signal. Also it may be said that the secondary apparatus is responsive to conditions of activation or non-detection of its detectors P1, P2, P3 and P6 to render the primary apparatus incapable of initiating operation of the foul signal 17 and is responsive to conditions of de-activation or detection of any one of its detectors P1, P2, P3 or P6 to initiate operation of the foul signal 17 dependent upon a signal operative condition of the primary control apparatus.

*Explanation and operation of Fig. 10*

From the foregoing explanation of the system as hooked up in accordance with Fig. 3, it will be evident that interception of any one of the light beams 21 to 26, inclusive, of Fig. 3 during the relatively long interval (six to twelve seconds preferably) that the relay R9 is energized, as a result of a ball having intercepted either light beam 24 or 25, will result in the calling of a foul. Experience has shown that this feature is desirable in connection with beams 21 and 23 to 26 inclusive but is objectional in connection with the beam 22 for the reason that the interception of beam 22 of Fig. 3 occasionally results in the calling of a foul as a result of an act occurring subsequent to the act resulting in the discharge of a bowled ball and which act does not, under the rules, constitute a foul. For example, the swinging of a foot, or the like, over but clear of the foul line and alley after the act resulting in the bowled ball has been fully completed, and even while the ball is still rolling on the alley and the relay R9 is still energized, does not constitute a foul even though it may result in interruption of the upper foul line beam 22. Obviously, therefore, with the system hooked up in accordance with Fig. 3, there remains the possibility of misinterpreting certain legitimate acts for fouls and producing an occasional false foul signal.

It is for the purpose of overcoming the above noted objection to the system, when hooked up as in Fig. 3, that I provide the improvement therein illustrated in Fig. 10, wherein all parts and wires common to Fig. 3 are indicated as like parts and wherein those elements of Fig. 3, not necessary for the purpose of explaining the operation of the additional feature of Fig. 10, have been omitted. For the purpose of automatically rendering the photo-cell P2 inoperative to initiate a foul, independently of relay R9, I interpose in the lead 117, contacts 127 and 128 of a relay R11. The coil 38 of this relay R11 is normally de-energized but is adapted to be energized from a fast heating type rectifier tube V11, whose two plates 35' are tied together and connected to a common lead 90. The filament 33' of the tube V11 is connected in a permanently closed circuit with the secondary of transformer T11 whose primary winding is connected in a normally open circuit comprising a lead 129, a lead 130, lead 74, contacts 61 and 60 of relay R9, lead 75 and part of lead 67.

The system incorporating the improvement of Fig. 10 will respond to a bowled ball just as does the system of Fig. 3 which is to say that the interception of one or both of the beams 24 and 25 will cause momentary de-energization of relays 4 and 5 and consequent energization of relay R9 resulting in an upward movement of the contacts 58 and 61 of relay R9 and the sustaining thereof in that position for a period of six to twelve seconds. Also in the system of Fig. 10 as in the system shown in Fig. 3, the interruption of any one of the light beams 21 to 26 inclusive immediately after energization of the coil of relay R9 will result in a foul signal, since the contacts 127 and 128 of relay R11, and which are interposed in lead 117, are normally closed. However, the termination of the period during which the interruption of the light beam 22 will result in a foul signal following the energization of coil 38 of relay R9 is determined entirely independently of the relay R9 in the scheme of Fig. 10 and is brought about as follows, to wit, (a) as a result of the energization of coil 38 of relay R9, the primary circuit of the transformer T11 will be completed through the now closed contacts 61 and 60 of relay R9; (b) as a result of the closing of the primary circuit of transformer T11, vacuum tube V11 will start heating up and will reach an operating temperature within a relatively brief period, preferably not less than three and not over five seconds, at which time current will flow through the circuit of and energize the coil 38' of relay R11 and which circuit comprises part of lead 90, tube V11, lead 131, a lead 132, part of lead 75 and part of lead 67; and (c) responsive to this energization of coil 38' of relay R11, the switch contacts 127 and 128 of relay R11 will be opened, thereby breaking the lead 117 at this point and making it impossible to complete the circuit through the coil 38 of relay R7 responsive to subsequent closing of contacts 41 and 42 of relay R2, the system having now been rendered inoperative to produce a foul signal responsive to interruption of light beam 22 during the remainder of the time that relay R9 is energized.

With the system thus modified by incorporation of the improvement shown in Fig. 10, it is possible for a bowler to complete the act resulting in a bowled ball and then by an entirely separate and distinct act, subsequent to the three to five second interval required for the tube V11 to heat up and during the balance of the longer period that relay R11 remains energized, to swing his feet, arms, legs or hands through the beam 22 without causing a foul signal, so long as he keeps his hands, legs, arms, or the like, above the beams 21, 23, 24 or 25 and out of the wall beam 26. Of course, if during this time the bowler comes so close to the surface of the alley as to interrupt the beams 21 or 23, such an act will be treated as though he had touched the alley and a foul will be called.

What I claim is:

1. In a foul detecting and indicating system for bowling alleys having a foul line, a normally inoperative foul indicating signal, a device for detecting the presence of an object above the foul line, a device for detecting the passage of a bowling ball in a zone spaced from the foul line a distance sufficient that the ball will be beyond the foul line before entering said zone, and means under joint control of the detecting devices for controlling operation of the foul signal including a time delay device preserving the state of detection of the second device after the ball has passed through said zone and an element removing the first device from operation before the end of the operation of said time delay device.

2. In a foul detecting and indicating system for bowling alleys, having a foul line, a foul indicating signal, devices for detecting the presence of an object above the foul line including vertically spaced beams of light located directly above the foul line, a third device for detecting the passage of a bowling ball in a zone spaced from the foul line a distance sufficient that the ball will be beyond the foul line before entering said zone, and means under joint control of the detecting devices for controlling operation of the foul signal including a time delay device preserving the state of detection of the third device after the ball has passed through said zone and an element removing the device associated with the upper beam from operation before the end of the operation of said time delay device.

3. In a foul detecting and indicating system for bowling alleys, having a foul line, a foul indicating signal, vertically spaced detecting devices for detecting the presence of an object present above the foul line, detecting means spaced from said devices for determining that a bowling ball has been put into play, means for removing the upper of said devices from operation within a short time after said detecting means has been actuated by the ball placed in play, means controlled by said devices and said detecting means jointly for operating said signal.

4. In a foul detecting and indicating system for bowling alleys, having a foul line, a foul indicating signal, vertically spaced detecting devices for detecting the presence of an object present above the foul line, means for removing the upper of said devices from operation within a short time after the ball is placed in play, means coacting with said devices for operating said signal.

5. In a foul detecting and indicating system for a bowling alley having a foul line, a foul indicating signal, means creating two detector zones that extend transversely of a bowling alley beyond the foul line, one adjacent the foul line too wide to be covered by a bowling ball at any given time including a cascaded beam of light, said zones being spaced in such relation to one another that a bowling ball placed in play will pass out of the cascade zone before entering the other zone, independent detectors for detecting the presence of objects in said zones, said detectors being substantially instantly responsive to the presence of an object in their respective zones, and means under joint control of the two detecting devices for actuating the signal after the ball has been detected in said second zone.

6. In a foul detecting and indicating system for bowling alleys, a foul signal, independent devices for detecting the presence of objects in different zones extending transversely of a bowling alley in such spaced relation to each other that a bowling ball put in play will pass out of one zone before entering the other zone, the detecting device of said other zone including a relay energized by the presence of a ball in said other zone by a vacuum tube whose filament circuit is opened when said relay is energized, and means under joint control of the relay and the detecting means for the first zone for actuating said signal during the time the filament circuit is open.

7. In a foul detecting and indicating system for bowling alleys, a foul signal, vertically spaced means for detecting infractions of the rules of play at the foul line, the upper of said means including a beam of light extending parallel and above the foul line and above the other detecting means, a device for determining when a bowling ball has been placed in play, and means for rendering said upper means inoperative within a couple of seconds after said device has been actuated by said ball, and means jointly controlled by said means and said device for actuating said signal.

8. In a foul detecting and indicating system for a bowling alley, means for detecting infractions of rules of play at the foul line, means cooperative therewith for determining when a bowling ball has been placed in play, and means controlled by the last means for indicating to the bowler that the alley is ready to call a foul any time during the time that said readiness exists.

PUTNAM M. SMITH.

REFERENCES CITED

The following references are of record in the file of this patent:

UNITED STATES PATENTS

| Number    | Name        | Date           |
|-----------|-------------|----------------|
| 2,202,674 | Seaman      | May 28, 1940   |
| 2,037,671 | Yomnes      | Apr. 14, 1936  |
| 2,099,764 | Touceda     | Nov. 23, 1937  |
| 2,214,274 | Glendenning | Sept. 10, 1940 |